United States Patent
Chu et al.

(10) Patent No.: US 8,625,776 B2
(45) Date of Patent: Jan. 7, 2014

(54) DETECTION AND SUPPRESSION OF RETURNED AUDIO AT NEAR-END

(75) Inventors: Peter L. Chu, Lexington, MA (US); Wayne Dunlap, Austin, TX (US)

(73) Assignee: Polycom, Inc., San Jose, CA (US)

( * ) Notice: Subject to any disclaimer, the term of this patent is extended or adjusted under 35 U.S.C. 154(b) by 1045 days.

(21) Appl. No.: 12/565,374

(22) Filed: Sep. 23, 2009

(65) Prior Publication Data

US 2011/0069830 A1 Mar. 24, 2011

(51) Int. Cl.
  *H04M 9/08* (2006.01)
(52) U.S. Cl.
  USPC .................................. 379/406.14
(58) Field of Classification Search
  USPC .................................. 379/406.14
  See application file for complete search history.

(56) References Cited

U.S. PATENT DOCUMENTS

| 4,995,030 | A | 2/1991 | Helf | |
|---|---|---|---|---|
| 6,865,270 | B1 | 3/2005 | Troxel | |
| 6,925,175 | B2 * | 8/2005 | Tegethoff | 379/406.01 |
| 2006/0007872 | A1 * | 1/2006 | Liu | 370/286 |
| 2006/0140392 | A1 | 6/2006 | Ahmadi | |
| 2006/0161428 | A1 | 7/2006 | Fouret | |
| 2008/0218586 | A1 * | 9/2008 | Graham et al. | 348/14.09 |
| 2009/0185674 | A1 * | 7/2009 | Sorensen et al. | 379/406.01 |
| 2009/0202063 | A1 | 8/2009 | Frauenthal et al. | |

FOREIGN PATENT DOCUMENTS

| CA | 2513224 | 3/2004 |
|---|---|---|
| CA | 2611302 | 12/2006 |
| CN | 1223036 A | 7/1999 |
| GB | 2439989 | 1/2008 |
| GB | 2439990 | 1/2008 |
| GB | 2439991 | 1/2008 |
| WO | 8907370 | 8/1989 |
| WO | 9642142 | 12/1996 |
| WO | 97/49196 A2 | 12/1997 |
| WO | 9749196 | 12/1997 |
| WO | 03049285 | 6/2003 |
| WO | 2006111370 | 10/2006 |
| WO | 2006111370 A1 | 10/2006 |

OTHER PUBLICATIONS

"CIGear Unified Communications, VoIP and Network Solutions" www.cigear.com/iptube-dlt1-dual-t1-dual-101000baset-echo-cancellation-p-1553.html.

(Continued)

*Primary Examiner* — Alexander Jamal
(74) *Attorney, Agent, or Firm* — Wong, Cabello, Lutsch, Rutherford & Brucculeri, LLP (57) ABSTRACT

Audio from a near-end that has been acoustically coupled at the far-end and returned to the near-end unit is detected and suppressed at the near-end of a conference. First and second energy outputs for separate bands are determined for the near-end audio being sent from the near-end unit and for the far-end audio being received at the near-end unit. The near-end unit compares the first and second energy outputs to one another for each of the bands over a time delay range and detects the return of the sent near-end audio in the received far-end audio based on the comparison. The comparison can use a cross-correlation to find an estimated time delay used for further analysis of the near and far-end energies. The near-end unit suppresses any detected return by muting or reducing what far-end audio is output at its loudspeaker.

32 Claims, 5 Drawing Sheets

(56) References Cited

OTHER PUBLICATIONS

"Polycom MGC/MGC+ Unified Conferencing Bridges Solution Overview" Polycom Solution Overview Booklet.
"Adaptive Filtering Algorithms for Acoustic Echo and Noise Cancellation" by Geert Rombouts Apr. 25, 2003.
"Bi-Directional (Near-End and Far-End) Adaptive Line Echo Cancellation" www.tecteon.com/web/index.php?id=73.
"Network Adaptive Line Echo Canceller (LEC)" www.tecteon.com/web/index.php?id=75.
"Automated Bi-Directional (Near and Far End) Echo Cancellation White Paper" Tecteon booklet.
"Tecteon Superior Quality Sound; Bi-Directional Echo Conceller" Tecteon Information Flyer.
"200 OK; Commentary on VoIP Network Design, Engineering, and Operations." May 26, 2008 by Mark Lindsey www.200ok.info/2008/05/why-wont-anybody-build-far-end-echo.html.
EP Search Report dated Dec. 10, 2010, in application No. 10009945.
First Office Action in counterpart Chinese Appl. 201010287069.9, dated Jan. 17, 2013.

* cited by examiner

DETECTION AND SUPPRESSION OF RETURNED AUDIO AT NEAR-END

BACKGROUND

During a conference, at least two communication systems (i.e., a near-end unit and a far-end unit) participate in a call. Typically, the units will have near-end echo cancellation. For example, a near-end unit 10 schematically shown in FIG. 1 has an audio decoder 12, an audio coder 14, a loudspeaker 20, and a microphone 40 and communicatively couples to a far end unit 16 using techniques known in the art. During a conference, the audio decoder 12 receives far-end audio, decodes it, and sends the decoded audio to the loudspeaker 20 so the near-end participant can listen. In turn, the microphone 40 picks up near-end audio from the participant, and the audio coder 14 encodes the near-end audio and sends it to the far-end unit 16. Due to the proximity of the loudspeaker 20 and microphone 40, acoustic coupling (indicated by arrow 11) may occur in which far-end audio output by the loudspeaker 20 is picked up by the microphone 40 and fed back to the far-end unit 16.

Figure 1:
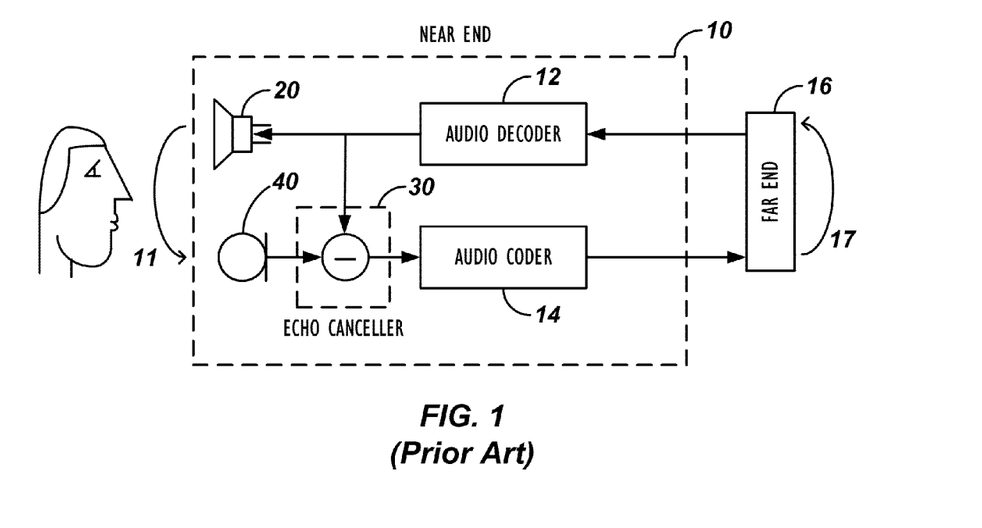
FIG. 1 illustrates a near-end echo canceller according to the prior art.

To reduce the effects of this acoustic coupling (11), the near-end unit 10 has a near-end echo canceller 30 that operates between the decoder/coder 12/14 and the loudspeaker/microphone 20/40. The near-end echo canceller 30 subtracts the audio emitted from the loudspeaker 20 that has been picked up by the microphone 40. The audio coder 14 then transmits the resulting signal to the far-end unit 16. In this way, the near-end echo cancellation reduces the acoustic coupling in the loudspeaker-to-microphone acoustic path at the near-end and helps to prevent the far-end participant from hearing his own voice come back to him as returned echo.

Although near-end echo cancellation may be used at the near-end unit, the far-end unit 16 in some instances may not have a working acoustic echo canceller. In this case, the near-end participant will hear his voice come back to him due to the acoustic coupling (indicated by arrow 17) between the loudspeaker and microphone at the far-end. Therefore, near-end echo cancellation may benefit the person at the far-end, but it does nothing to prevent the near-end from hearing near-end audio returned from the far-end as echo.

The subject matter of the present disclosure is directed to overcoming, or at least reducing the effects of, one or more of the problems set forth above.

SUMMARY

Audio from a near-end that has been acoustically coupled at the far-end and returned to the near-end unit is detected and suppressed at the near-end of a conference. First energy outputs for separate bands are determined for the near-end audio being sent from the near-end unit, and second energy outputs for the separate bands are determined for the far-end audio being received at the near-end unit. The near-end unit compares the first and second energy outputs for each of the bands to one another over a time delay range and detects the return of the sent near-end audio in the received far-end audio based on the comparison. The comparison can use a cross-correlation to find an estimated time delay used for further analysis of the near and far-end energies. The near-end unit suppresses any detected return by muting or reducing what far-end audio is output at its loudspeaker.

The foregoing summary is not intended to summarize each potential embodiment or every aspect of the present disclosure.

DETAILED DESCRIPTION

A. Near-End Unit Having Echo Detection and Suppression

Figure 2:
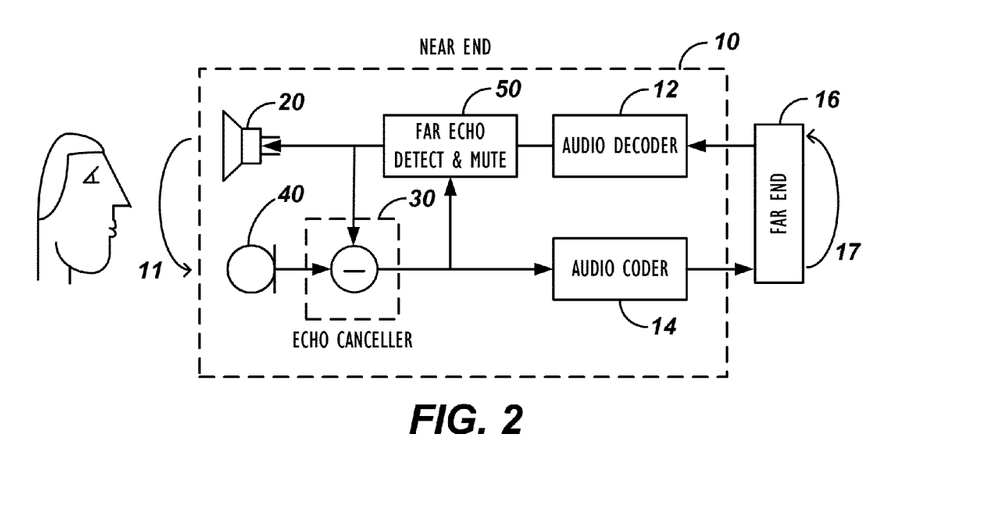
FIG. 2 illustrates an arrangement for far-end echo detection and suppression according to the present disclosure.

A near-end unit 10 schematically shown in FIG. 2 can be used for teleconferencing or videoconferencing. As noted previously, the near-end unit 10 has an audio decoder 12, an audio coder 14, a loudspeaker 20, and a microphone 40 and communicatively couples to a far-end unit 16 using techniques known in the art. During a conference, the audio decoder 12 receives far-end audio, decodes it, and sends the decoded audio to the loudspeaker 20 so the near-end participant can listen. In turn, the microphone 40 picks up near-end audio from the participant, and the audio coder 14 encodes the near-end audio and sends it to the far-end unit 16.

To reduce the effects of the acoustic coupling (indicated by arrow 11) at the near-end, the near-end unit 10 has a near-end echo canceller 30 that subtracts the audio emitted from the loudspeaker 20 that has been picked up by the near-end microphone 40 through acoustic coupling. As noted previously, the near-end echo cancellation 30 reduces the acoustic coupling in the loudspeaker-to-microphone acoustic path at the near-end and helps to prevent the far-end participant from hearing his voice come back to him as echo.

In addition to these components, however, the near-end unit 10 has a module 50 for detecting and suppressing near-end audio returned from the far-end through acoustic coupling (indicated by arrow 17). When the far-end unit 16 fails to provide sufficient echo cancellation, the module 50 detects the presence of near-end audio returned in the far-end audio and prevents or suppresses that returned audio from being relayed through the loudspeaker 20 at the near-end.

As shown, the module 50 receives the decoded audio from the audio decoder 12 before the audio proceeds to the loudspeaker 20 and echo canceller 30. In this arrangement, the module 50 detects returned near-end audio in the far-end audio decoded by the audio decoder 12. As noted herein, the returned audio occurs when near-end audio is picked-up by the microphone 40 at the near-end, is transmitted to the far-end unit 16, undergoes loudspeaker-to-microphone acoustic coupling (17) at the far-end, and is then returned to the near-end's decoder 12 to be output by the near-end loudspeaker 20. As expected, receiving one's own voice replayed back can be very distracting for the near-end participant in the conference. When the module 50 detects such returned audio, the near-end loudspeaker 20 may be muted or otherwise turned down, thereby eliminating or reducing what returned audio is output by the loudspeaker 20 at the near-end.

Although the location of the module 50 is conceptually straightforward in the near-end unit 10, there are a number of practical challenges at the near-end to detecting near-end audio that has been returned from the far-end. For example, the module 50 must be able to handle any time delay in the far-end audio. This delay can range anywhere from 10's of milliseconds to 1 second or more and may change over time during a conference call. In addition, the audio coder and other components (not shown) at the far-end unit 16 may introduce significant non-linear distortion and noise to the returned audio that the module 50 must deal with. Further, the returned audio may have wide-ranging amplitude and frequency responses so that the returned audio's amplitude may be very weak or very strong at any given time and may alter drastically in frequency from the original signal.

B. Process for Echo Detection and Suppression

Figure 3:
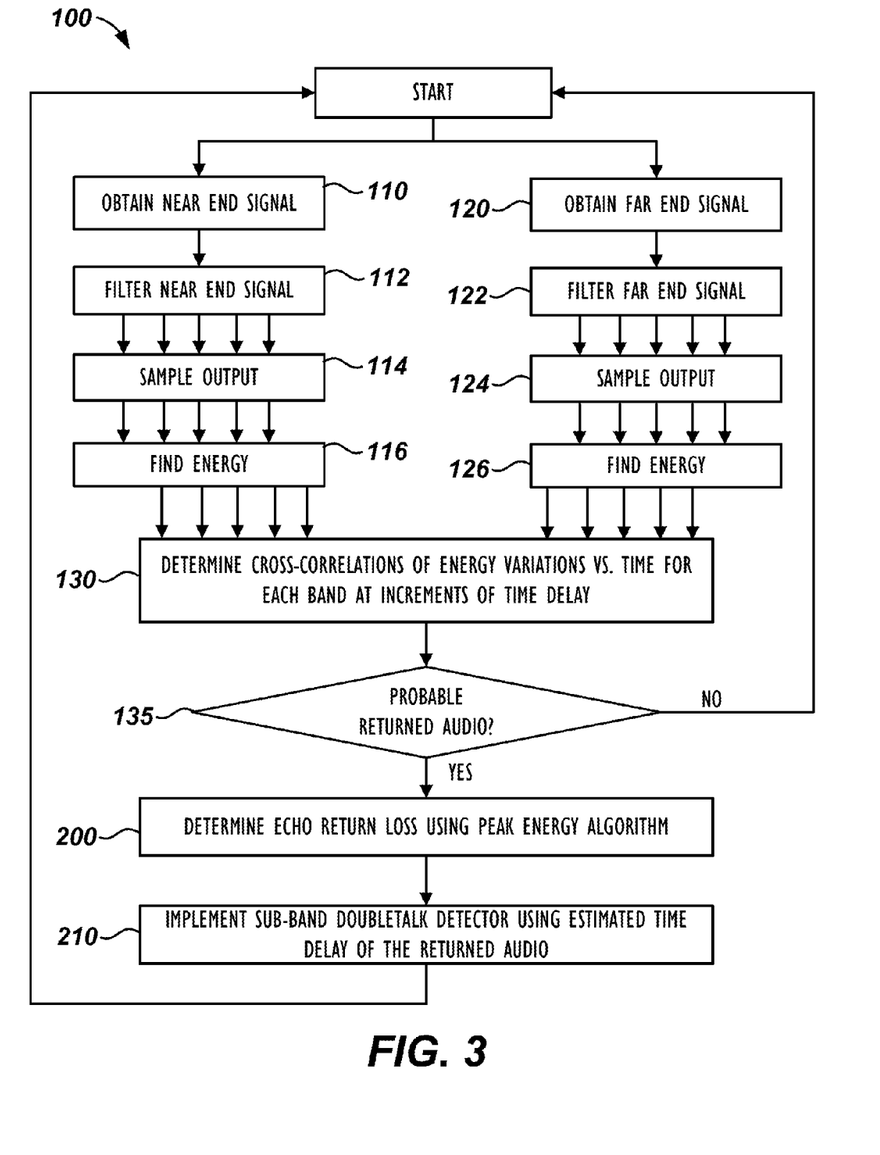
FIG. 3 illustrates a signal processing operation for far-end echo detection and suppression according to the present disclosure.

To detect and suppress the returned audio in light of the above challenges, the module 50 of FIG. 2 performs a signal processing operation 100 as shown in FIG. 3. In the operation 100, the module 50 obtains both the near-end and far-end audio signals (Blocks 110/120) and uses filterbanks to separately filter the obtained signals into a number of bands (Blocks 112/122). The module 50 samples the output for each band and each signal at a predetermined interval (Block 114/124) and finds the energy of the sampled output for each band (Block 116/126).

Figure 4:
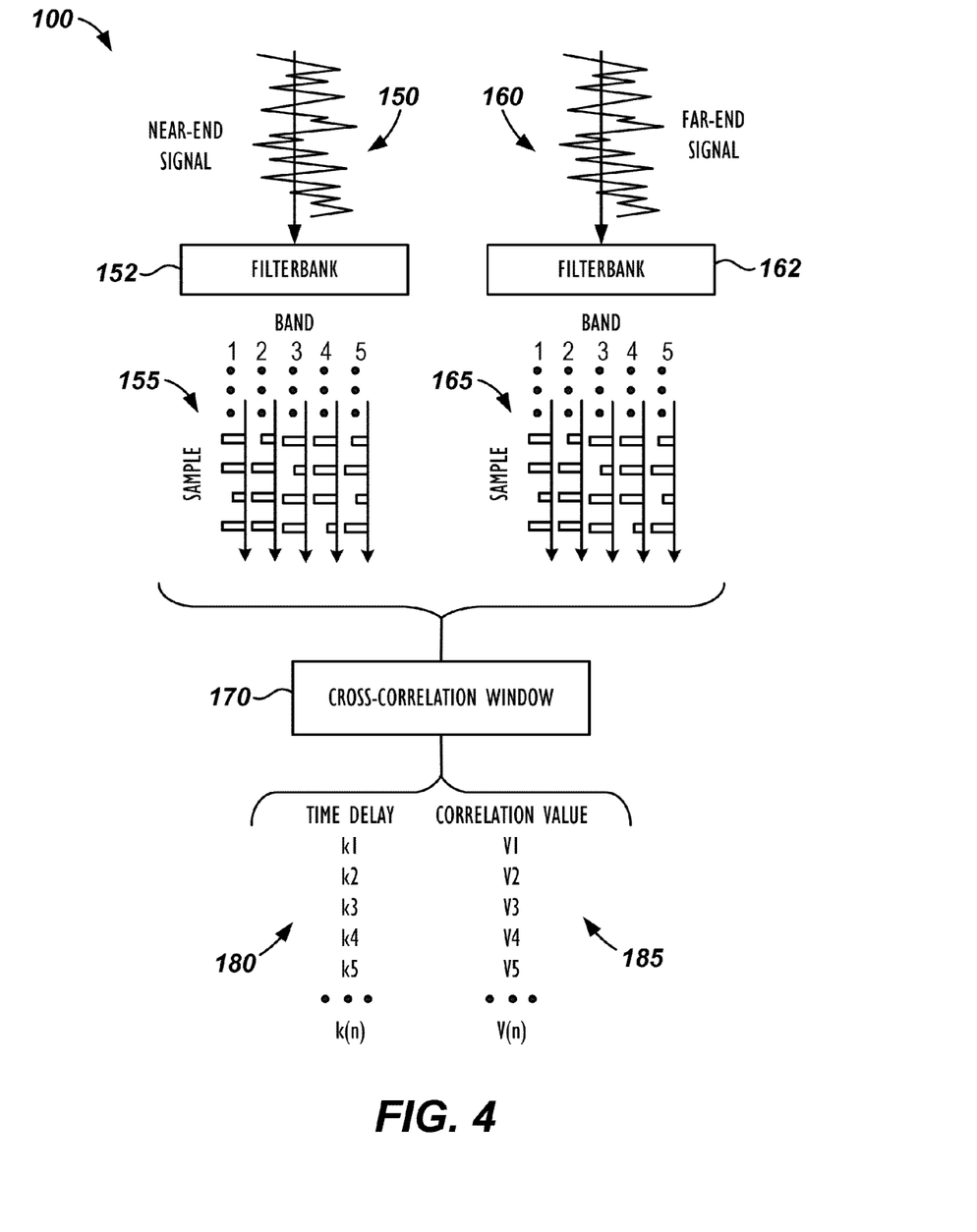
FIG. 4 diagrammatically illustrates the far-end echo detection and suppression of an example signal.

As shown FIG. 4, for example, the module 50 can obtain the near-end and far-end audio signals 150/160 at a sample rate of about 48 kHz, and the near-end and far-end signals are fed to separate filterbanks 152/162 that consist of five sub-bands centered at about 400, 800, 1200, 1600, and 2000 Hz. The filterbanks 152/162 can use filters that are cosine and sine modulated versions of a Blackman window of 10-ms in length, producing real and imaginary parts of the sub-band signal every 20-ms. Such a filterbank may be implemented very efficiently because of the commonality of operations between the different sub-bands. These separate filterbanks 152/162 filter the signals into five bands (1-5). The output of each band (1-5) can be sampled at every 20-ms, and the module 50 can find the energy of the sampled output for each band (1-5) to produce sampled output signals 155/165.

Continuing with the operation 100 of FIG. 3, the module 50 compares the energy variations in the near-end and far-end signals as a function of time in a range of time delay (Block 130). In doing this comparison, the module 50 cross-correlates the corresponding bands of each of the signals at different time delays. From this cross-correlation, the module 50 determines the presence of returned near-end audio in the received far-end audio at a given time delay when there is a peak in the cross-correlation values for each of the bands of the two compared signals.

As shown in FIG. 4, for example, the operation 100 runs a cross-correlation window 170 described in more detail below. From the results of the window 170, the operation 100 determines at which time delay value 180 high cross-correlation values 185 occur between what is sent by the near-end unit at one point in time to what is received from the far-end unit at a subsequent point in time. High cross-correlation values 185 at a particular time delay value 180 indicates the presence of returned near-end audio in the far-end audio received at this time delay.

Returning to FIG. 3, the operation 100 determines from the cross-correlation results whether near-end audio is probably being returned in the far-end audio received (Decision 135). If returned audio is not occurring (no for Decision 135), the operation 100 can return to repeating steps of finding energy to determine if audio is currently being returned (i.e., Blocks 110, 120, etc.). However, if enough high correlations occur at the same time delay value (yes for Decision 135), the operation 100 declares the presence of returned near-end audio at that time delay. At this point, the module 50 uses the estimated time delay value at which the near-end audio is probably being returned from the far-end and continues processing to handle the returned audio.

Although the cross-correlation process (Block 130) for detecting the presence of the returned audio at a time delay is reliable, the process can be slow due to the integration over time needed to obtain accurate estimates. If the cross-correlation is used alone, some returned audio may be output at the near-end. Accordingly, the cross-correlation process (Block 130) is essentially used to estimate a time delay value for potential returned audio. Once this is done, the module 50 preferably uses a faster-responding detection scheme that directly uses the sub-band energy when the cross-correlation process (Block 130) has determined that near-end audio is being returned.

To handle the returned audio in this faster scheme, the operation 100 determines the echo return loss (ERL) using a peak energy algorithm when the cross-correlation is high enough (Block 200). In general, this process 200 finds the peak energy of the outgoing (near-end) audio in each band and finds the peak energy of the incoming (far-end) audio in each band at the estimated time delay. If the near-end energy is being returned in the received far-end audio at the time delay, then the peak energy for one or more of the bands will reflect this.

After finding the echo return loss, the operation 100 then implements a sub-band doubletalk detector using the estimated time delay of the returned audio (Block 210). At this point, the operation 100 knows the estimated time delay at which the near-end audio is being returned from the far-end, and the operation 100 knows the energy that comes back at that estimated time delay. Therefore, the doubletalk detection (Block 210) can determine whether the energy coming in from the far-end audio is primarily or solely due to the near-end audio (speech) being returned as echo or whether someone at the far-end is speaking over some portion of possible echo.

In essence, if the doubletalk detection (Block 210) determines that peak energy in any particular sub-band of the far-end audio at the time delay is greater than the peak energy of the same band in the near-end audio, then the doubletalk detection (Block 210) can determine that far-end speech is occurring. Therefore, the doubletalk detection will not suppress or mute the far-end audio being output at the near-end unit 10. Ultimately, if doubletalk is not occurring, then the operation 100 has the module 50 suppress or mute the far-end audio to prevent returned near-end audio from being output at the near-end. Again, the near-end loudspeaker 20 may be muted or otherwise turned down to suppress the returned audio.

1. Details of Cross-Correlation Process

Given the above-description of the process for determining the presence of returned audio and its time delay, discussion now turns to particular examples of the cross-correlation process for estimating a time delay at which near-end audio is potentially being returned. In one implementation, the module 50 in FIG. 3 can use a moving average operation to determine the cross-correlation between the near and far-end sub-band energies. For two sequences in time x(t),y(t), for example, a definition of cross-correlation for a time delay or lag k at a time index n is provided by:

$$\text{Corr}[n][k] = \left(\sum_{t=n}^{n-N} x(t)y(t-k)\right) \bigg/ \left(\sqrt{\sum_{t=n}^{n-N} x^2(t)} \sqrt{\sum_{t=n}^{n-N} y^2(t)}\right) \quad (1)$$

Here, the first sequence in time x(t) can correspond to the sampled energy of a given band for the near-end audio, while the second sequence in time y(t) can correspond to the sampled energy of the given band for the far-end audio. In equation (1), if the value of Corr[n][k] is close to 1, then the time sequences x(t),y(t) are very similar in shape for the time index n and time delay or lag k. The summation over N terms in equation (1) may be viewed as a moving average operation.

As an alternative to the moving average of equation (1), the module 50 can reduce computation by replacing the moving average operation with an Infinite Impulse Response (IIR) filter. In this implementation, the IIR filter can be provided as:

$$\text{Corr}[n][k] = \text{NumCross}(n)/(\sqrt{\text{DemX}(n)}\sqrt{\text{DenY}(n)}) \quad (2)$$

where
NumCross(n)=α·NumCross(n−1)+(1−α)·x(n)y(n−k)
DenX(n)=α·DenX(n−1)+(1−α)·x²(n)
DenY(n)=α·DenY(n−1)+(1−α)·y²(n)

When used, equation (2) can find the cross-correlation in time between the near-end and far-end bandpass energy time sequences (energy found at 20-ms intervals). When the cross-correlation between the near and far-end bandpass energy time sequences is high, the module 50 estimates this to be a reliable estimation that near-end audio is being returned at the corresponding time delay or lag k and uses this estimation to perform further processing.

As shown in FIG. 4, for example, the cross-correlation can be done efficiently using the Infinite Impulse Response (IIR) window 170 (as described above) with a time constant (α) of 0.8 seconds. The time delay or lag k is preferably constrained in the range of 0 to about 3 seconds (i.e., 2.56 seconds). The presence of returned audio will cause a peak in the cross-correlation value 185 at some time lag (k) 180 for each of the sub-bands. If the cross-correlation peak value 185 is high for all the sub-bands at a similar cross-correlation time lag (k) 180 for all of the sub-bands, then there is a high probability that near-end audio is being returned at that time index.

2. Details of Peak Energy and Double Talk Detection

Given the above-description of the cross-correlation process for estimating a time delay at which near-end audio is potentially being returned, discussion now turns to the faster-responding detection scheme that determines the echo return loss (ERL) (200) using a peak energy algorithm and then implements a sub-band doubletalk detector (210) using the estimated time delay. As shown in more detail in FIG. 5, for example, when the cross-correlation between the near and far-ends is high enough at a particular time delay, the ERL process (200) estimates the ratio of the energies of the far-end energy to the near-end energy (i.e., Echo Return Loss (ERL)) for each band (Block 202). The ERL process (200) then multiples the near-end energy by the ERL value (Block 204). Because near-end audio is believed to be returning, the expected result should equal the far-end energy. If it does not, then the process (200) may terminate and return to estimating a probable time delay of returned audio. Otherwise, the operation 100 continues processing by implementing the sub-band doubletalk detector (210).

Figure 5:
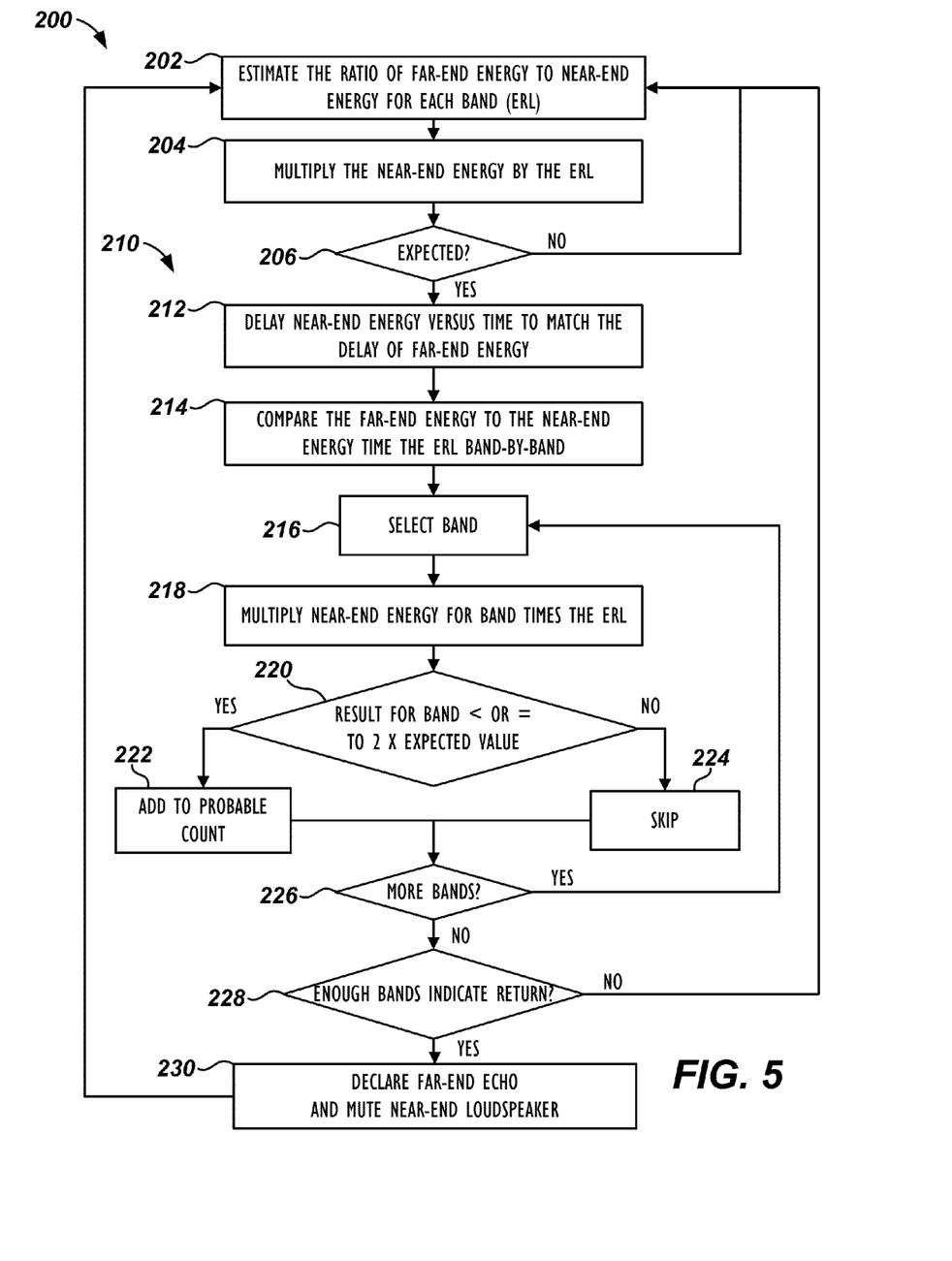
FIG. 5 illustrates additional stages of the signal processing operation of FIG. 3.

The doubletalk detector (210) then delays the near-end energy versus time so that it matches the delay of the far-end energy (Block 212). Then, the doubletalk detector (210) selects a first of the bands (Block 216), multiplies the ERL times the near-end energy for that band (Block 218), and compares the far-end energy to the ERL times the near-end energy (Decision 220).

If the comparison shows that the far-end energy is at or below twice its expected value (yes-Decision 220), then the band count for probable returned audio is incremented (Block 222). If the far end energy for the band is more than twice its expected value, then the band is not added to the band count. Either way, the doubletalk detector (210) determines if more bands remain to be analyzed (Decision 226) and operates accordingly. After comparing the far-end energy to the ERL times the near-end energy band-by-band (Block 216 through 226), the doubletalk detector (210) determines whether enough bands of the far-end energy are at or below twice their expected value (Decision 228).

If enough bands of the far-end energy are more than (i.e., not at or below) twice their expected value (no at Decision 228), then the doubletalk detector (210) does not declare that returned audio is being received. Instead, this may indicate that a participant at the far-end is talking while the near-end is silent or is producing much less energy. Therefore, the audio being output by the near-end loudspeaker (20; FIG. 2) is not muted or reduced.

If enough bands of the far-end energy are at or below twice their expected value (yes at Decision 228), then the doubletalk detector (210) declares the presence of returned near-end audio as echo (Block 230). The total number of bands that must show that the near-end energy times the ERL for that band is at or below the expected value to warrant declaring returned audio may depend on the implementation. In general, however, if a majority or more than half of the bands show the required result, then the doubletalk detector (210) can declare that returned audio is being received.

At this point, the module (50) of the near-end unit (10) in FIG. 2 can suppress the returned audio by muting or turning down the audio output by the near-end loudspeaker (20). The actual amount of time for muting or suppressing the audio may depend on the implementation and may last for the amount of time that returned audio is detected or may last for some predetermined amount of time. For example, the output audio can be suppressed at the near-end for a predetermined time interval, until detection of the returned audio ceases, or until speech having a magnitude greater than the returned is detected in the far-end audio received.

As the operation 100 of FIGS. 3-5 continues during a call, the module 50 of FIG. 2 can produce half-duplex suppression of the returned audio at the near-end unit 10 so that the near-end participant will not hear her voice relayed back to her by the far-end unit's failure to cancel out any acoustic coupling that may be occurring at the far-end. However, if the far-end has a working echo canceller, the operation 100 is expected to not detect returned audio falsely. In general, the module's ability to detect returned near-end audio is expected to operate under various amplitudes, phase-variations, and changes in delay over time, as well as audio codec distortions. Based on what they hear, neither near-end nor far-end participant may know whether or not their own echo canceller is working, making automated operation of the module 50 beneficial.

The module 50 for detecting and suppressing the returned audio can be used with Polycom's HDX9004 system. Using a sampling rate is 48 kHz, for example, the module 50 in the HDX9004 system can process 20-ms blocks of far-end and near-end audio at a time and can declare the presence or absence of returned near-end audio in the far-end audio block using a low computing cost of about 1.37 million instructions per second on a Trimedia PNX1700 chip used in the system.

In addition, the module 50 can detect the very first occurrence of returned audio and reliably estimate a time delay for it within about 2 to 3 seconds of a participant's speech. At that point, the module 50 can mute the output audio in about 0.2 seconds of speech.

C. Multipoint Bridge Unit

Previous arrangements focused on using the module 50 in a conferencing unit (e.g., near-end unit). Yet, far-end echo is a common problem in multi-way calls having multiple sites jointly connected in a call. The more sites involved increase the chances that one site may lack an echo canceller to reduce the effects of acoustic coupling at the site. Therefore, the disclosed techniques for detecting and suppressing returned audio can also be used in a multipoint bridge unit that handles calls for multiple units. Suitable examples of multipoint bridge units include the MGC-25, MGC-F50 (RediConvene™), or MGC+100 (RediConvene™), which are unified multipoint conferencing bridges with integrated conference management available from Polycom, Inc.—the assignee of the present disclosure.

Figure 6:
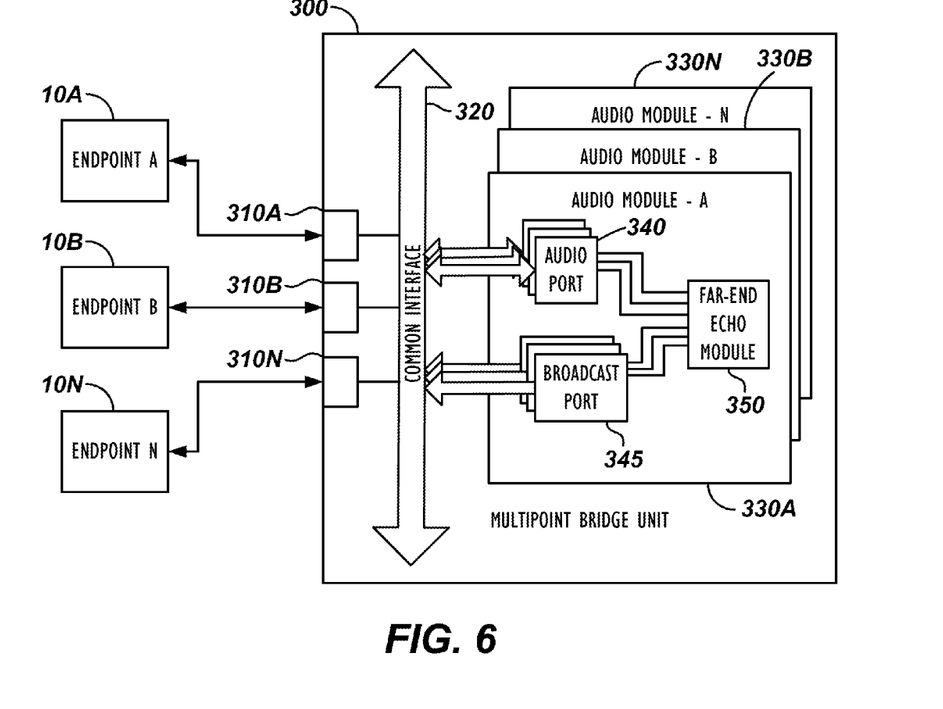
FIG. 6 illustrates a multipoint bridge unit having a far-end echo detection and suppression module according to the present disclosure.

As schematically shown in FIG. 6, a multipoint bridge unit 300 has a number of input/output connections 310A-N to various endpoints 10A-N that it handles for conference calls. These connections 310A-N couple to a common interface 320, which in turn connects to various audio modules 330A-N for each of the connected endpoints. As is typical, the audio modules 330A-N handle the audio for the endpoints 10A-N in the conference calls. For example, one audio module 310A can receive the input (near-end) audio from a dedicated endpoint 10A for sending on to one or more other endpoints in a conference call. Likewise, the same audio module 310A can send output (far-end) audio from the other endpoints to the dedicated endpoint 10A. To handle the sending and receiving of audio between the endpoints, each module 330 can have audio ports 340 and/or broadcast ports 345 for the endpoints in the call, depending on how the calls are set up. For example, an audio port 340 can be assigned to one of the endpoints in the call to which the endpoint dedicated to the module 330 is participating in, and the port 340 can be used to send and receive audio with that endpoint. On the other hand, the broadcast port 345 can be assigned to one of the endpoints in the call that is only receiving audio.

In addition to the conventional components described above, the unit 300 has a module 350 for detecting and suppressing returned audio. When one of the particular endpoints 10 fails to provide sufficient echo cancellation (e.g., it lacks an echo canceller), the module 350 detects the presence of returned audio (echo) from that endpoint and prevents or suppresses that returned audio from being relayed to the other endpoints. Therefore, this module 350 can use the same processes discussed previously with respect to an endpoint unit.

Digital electronic circuitry, computer hardware, firmware, software, or any combination thereof can implement the techniques of the present disclosure, and a computer program tangibly embodied in a machine-readable medium for execution by a programmable processor can also implement the disclosed techniques so that a programmable processor can execute a program of instructions to perform functions of the disclosed techniques by operating on input data and generating output. Suitable processors include, by way of example, both general and special purpose microprocessors. Generally, a processor will receive instructions and data from a read-only memory and/or a random access memory. Accordingly, the near-end conferencing unit 10 of FIG. 2 and the multipoint bridge unit 300 of FIG. 5 can each have a processor (not shown) to execute instructions and handle data for the module 50/350.

Generally, a computer includes one or more mass storage devices (e.g., magnetic disks, internal hard disks, removable disks, magneto-optical disks, optical disks, etc.) for storing data files. Storage devices suitable for tangibly embodying computer program instructions and data include all forms of non-volatile memory, including by way of example, semiconductor memory devices (e.g., EPROM, EEPROM, and flash memory devices), magnetic disks (e.g., internal hard disks and removable disks), magneto-optical disks, CD-ROM disks, and other computer-readable media. Any of the foregoing can be supplemented by or incorporated into application-specific integrated circuits.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of suppressing near-end audio acoustically coupled at a far-end and returned to the near-end in a conference, the method comprising:
    determining first energy output of near-end audio sent from a near-end conferencing unit to a far-end conferencing unit by filtering the near-end audio into the first bands and determining first energy outputs of each of the first bands;
    determining second energy output of far-end audio sent from the far-end conferencing unit to the near-end conferencing unit by filtering the far-end audio into the second bands and determining second energy outputs of each of the second bands;
    detecting a return of the near-end audio in the far-end audio by
        cross-correlating variations in the first and second energy outputs for each of the bands to one another at increments of time delay over a time delay range,
        determining the time delay having a greatest cross-correlation for all of the bands,
        estimating for each of the bands a ratio of the far-end energy to the near-end energy,
        determining a result by multiplying the near-end energy by the ratio, and
        determining whether the result is equal to the far-end energy,
        wherein the detected return is caused by the near-end audio sent from the near-end conferencing unit to the far-end conferencing unit being acoustically coupled at the far-end conferencing unit and returned as part of the far-audio sent from the far-end conferencing unit; and
    suppressing the detected return from output at the near-end conferencing unit.

2. The method of claim 1, wherein the first and second bands each center at 400, 800, 1200, 1600, and 2000 Hz.

3. The method of claim 1, wherein comparing the first and second energy outputs to one another over the time delay range comprises comparing the first and second energy outputs for each of the bands to one another over the time delay range.

4. The method of claim 1, wherein detecting the return comprises:
    offsetting the near-end energy versus time to match the far-end energy;

comparing the far-end energy outputs to the offset near-end energy outputs times the ratio for each of the bands; and
determining a count of how many of the bands have near-end energy outputs multiplied times the ratio that is at least less than or equal to an expected value.

5. The method of claim 4, wherein detecting the return comprises declaring a presence of the return when the determined count is greater than a threshold.

6. The method of claim 1, wherein the time delay range is from 0 to about 3-seconds.

7. The method of claim 1, wherein determining the first and second energy outputs is done at predetermined sample times.

8. The method of claim 1, wherein suppressing the detected return from output at the near-end conferencing unit comprises muting output of the far-end audio at a near-end loudspeaker.

9. The method of claim 1, wherein suppressing the detected return at the near-end comprises reducing output of the far-end audio at a near-end loudspeaker.

10. The method of claim 1, wherein the detected return is suppressed at the near-end conferencing unit for a predetermined time interval, until detection of the return ceases, or until speech having a magnitude greater than the return is detected in the far-end audio.

11. A non-transitory machine-readable medium having program instructions stored thereon for causing a programmable control device to perform a method of suppressing near-end audio acoustically coupled at a far-end and returned to the near-end in a conference, the method comprising:
determining first energy output of near-end audio sent from a near-end conferencing unit to a far-end conferencing unit by filtering the near-end audio into first bands and determining first energy outputs of each of the first bands;
determining second energy output of far-end audio sent from the far-end conferencing unit to the near-end conferencing unit by filtering the far-end audio into second bands and determining second energy outputs of each of the second bands;
detecting a return of the near-end audio in the far-end audio by
cross-correlating variations in the first and second energy outputs for each of the bands to one another at increments of time delay over a time delay range,
determining the time delay having a greatest cross-correlation for all of the bands,
estimating for each of the bands a ratio of the far-end energy to the near-end energy,
determining a result by multiplying the near-end energy by the ratio, and
determining whether the result is equal to the far-end energy,
wherein the detected return is caused by the near-end audio sent from the near-end conferencing unit to the far-end conferencing unit being acoustically coupled at the far-end conferencing unit and returned as part of the far-audio sent from the far-end conferencing unit; and
suppressing the detected return from output at the near-end conferencing unit.

12. A method of suppressing near-end audio acoustically coupled at a far-end and returned to the near-end in a conference, the method comprising:
sending near-end audio from a near-end conferencing unit to a far-end conferencing unit;
determining first energy outputs of first bands of the near-end audio at the near-end conferencing unit;
receiving far-end audio from the far-end conferencing unit at the near-end conferencing unit;
determining second energy outputs of each of second bands of the far-end audio received at the near-end conferencing unit;
detecting a return of the sent near-end audio in the received far-end audio by cross-correlation variations in the first and second energy outputs for each of the bands to one another at increments of time delay over a time delay range and determining the time delay having a greatest cross-correlation for all of the bands, the detected return being caused by the near-end audio sent from the near-end conferencing unit to the far-end conferencing unit being acoustically coupled at the far-end conferencing unit and returned as part of the far-end audio received at the near-end conferencing unit; and
suppressing the detected return from output at the near-end conferencing unit.

13. The method of claim 12, wherein determining the first energy outputs of first bands of near-end audio comprises:
obtaining the near-end audio at the near-end conferencing unit;
filtering the near-end audio into the first bands at the near-end conferencing unit; and
determining the first energy outputs of each of the first bands.

14. The method of claim 12, wherein determining the second energy outputs of second bands of far-end audio comprises:
obtaining the far-end audio received from the far-end conferencing unit at the near-end conferencing unit;
filtering the far-end audio into the second bands at the near-end conferencing unit; and
determining the second energy outputs of each of the second bands.

15. A conferencing unit, comprising:
a coder unit receiving near-end audio from a microphone and sending near-end audio signals to a far-end conferencing unit;
a decoder unit receiving a far-end audio signal from the far-end conferencing unit and sending far-end audio for output at a loudspeaker; and
a processor unit operatively coupled to the coder and decoder units and configured to:
filter the near-end audio into first bands,
determine first energy outputs of each of the first bands,
filter the far-end audio into second bands,
determine second energy outputs of each of the second bands, detect return caused by the near-end audio sent from the near-end conferencing unit to the far-end conferencing unit being acoustically coupled at the far-end conferencing unit and returned within the far-end audio received at the near-end conferencing unit, wherein to detect the return, the processor is configured to—cross-correlate variations in the first and second energy outputs to one another for each of the bands at increments of time delay over a time delay range, and determine the time delay having a greatest cross-correlation for all of the bands, and
suppress sending the detected return to a near-end loudspeaker.

16. The unit of claim 15, wherein the conferencing unit is a near-end conferencing unit communicatively coupled to the far-end conferencing network via a network.

17. The unit of claim 15, wherein the conferencing unit is a multipoint conferencing bridge unit communicatively coupled to a near-conferencing unit and the far-end conferencing network via a network.

18. The unit of claim 15, wherein to detect the return, the processor is configured to:
  estimate for each of the bands a ratio of the far-end energy to the near-end energy;
  determine a result by multiplying the near-energy by the ratio; and
  determine whether the result is equal to the far-end energy.

19. The unit of claim 18, wherein to detect the return, the processor is configured to:
  offset the near-end energy versus time to match the far-end energy;
  compare the far-end energy outputs to the offset near-end energy outputs times the ratio for each of the bands; and
  determine a count of how many of the bands have near-end energy outputs multiplied times the ratio that is at least less than or equal to an expected value.

20. The unit of claim 19, wherein to detect the return, the processor is configured to declare a presence of the return when the determined count is greater than a threshold.

21. The unit of claim 15, wherein suppressing the detected return from output at the near-end conferencing unit comprises:
  muting output of the far-end audio at a near-end loudspeaker; or
  reducing output of the far-end audio at the near-end loudspeaker.

22. The unit of claim 15, wherein the detected return is suppressed at the near-end conferencing unit for a predetermined time interval, until detection of the return ceases, or until speech having a magnitude greater than the return is detected in the far-end audio.

23. The method of claim 12, wherein detecting the return comprises:
  estimating for each of the bands a ratio of the far-end energy to the near-end energy;
  determining a result by multiplying the near-energy by the ratio; and
  determining whether the result is equal to the far-end energy.

24. The method of claim 23, wherein detecting the return comprises:
  offsetting the near-end energy versus time to match the far-end energy;
  comparing the far-end energy outputs to the offset near-end energy outputs times the ratio for each of the bands; and
  determining a count of how many of the bands have near-end energy outputs multiplied times the ratio that is at least less than or equal to an expected value.

25. The method of claim 24, wherein detecting the return comprises declaring a presence of the return when the determined count is greater than a threshold.

26. The method of claim 12, wherein suppressing the detected return from output at the near-end conferencing unit comprises:
  muting output of the far-end audio at a near-end loudspeaker; or
  reducing output of the far-end audio at the near-end loudspeaker.

27. The method of claim 12, wherein the detected return is suppressed at the near-end conferencing unit for a predetermined time interval, until detection of the return ceases, or until speech having a magnitude greater than the return is detected in the far-end audio.

28. The medium of claim 11, wherein comparing the first and second energy outputs to one another over the time delay range comprises comparing the first and second energy outputs for each of the bands to one another over the time delay range.

29. The medium of claim 11, wherein detecting the return comprises:
  offsetting the near-end energy versus time to match the far-end energy;
  comparing the far-end energy outputs to the offset near-end energy outputs times the ratio for each of the bands; and
  determining a count of how many of the bands have near-end energy outputs multiplied times the ratio that is at least less than or equal to an expected value.

30. The medium of claim 29, wherein detecting the return comprises declaring a presence of the return when the determined count is greater than a threshold.

31. The medium of claim 11, wherein suppressing the detected return from output at the near-end conferencing unit comprises:
  muting output of the far-end audio at a near-end loudspeaker; or
  reducing output of the far-end audio at the near-end loudspeaker.

32. The medium of claim 11, wherein the detected return is suppressed at the near-end conferencing unit for a predetermined time interval, until detection of the return ceases, or until speech having a magnitude greater than the return is detected in the far-end audio.

* * * * *